United States Patent
Kozu (10) Patent No.: US 8,494,484 B2
(45) Date of Patent: Jul. 23, 2013

(54) COMMUNICATION APPARATUS AND COMMUNICATION METHOD FOR TUNNEL SWITCHING

(75) Inventor: Kazuyuki Kozu, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 697 days.

(21) Appl. No.: 12/092,365

(22) PCT Filed: Nov. 1, 2006

(86) PCT No.: PCT/JP2006/321907
§ 371 (c)(1),
(2), (4) Date: Sep. 9, 2008

(87) PCT Pub. No.: WO2007/052720
PCT Pub. Date: May 10, 2007

(65) Prior Publication Data
US 2009/0239543 A1  Sep. 24, 2009

(30) Foreign Application Priority Data
Nov. 1, 2005 (JP) ............................. P2005-318859

(51) Int. Cl.
*H04M 1/66* (2006.01)
(52) U.S. Cl.
USPC ..... 455/410; 455/435.2; 455/438; 455/552.1; 455/561
(58) Field of Classification Search
USPC .......... 455/436–444, 331–334, 435.2, 552.1, 455/561
See application file for complete search history.

(56) References Cited

U.S. PATENT DOCUMENTS

| 6,415,151 B1 * | 7/2002 | Kreppel ........................ 455/445 |
| 6,975,872 B2 | 12/2005 | Cheng |
| 2003/0026220 A1 * | 2/2003 | Uhlik et al. .................... 370/328 |
| 2004/0008645 A1 * | 1/2004 | Janevski et al. ............... 370/331 |
| 2005/0163078 A1 | 7/2005 | Oba et al. |

FOREIGN PATENT DOCUMENTS

| CN | 1607849 A | 4/2005 |
| JP | 2004-72631 | 3/2004 |
| JP | 2005-086492 A | 3/2005 |
| JP | 2005-513934 | 5/2005 |
| TW | 558883 B | 10/2003 |
| TW | 200532594 | 10/2005 |
| WO | 0232165 A1 | 4/2002 |
| WO | 03/055261 | 7/2003 |
| WO | 2004045224 A1 | 5/2004 |
| WO | 2005096556 A1 | 10/2005 |
| WO | 2007/024115 A1 | 3/2007 |

OTHER PUBLICATIONS

Korean Official Action Letter for Application No. 10-2008-7010781, mailed on Nov. 20, 2009 (7 pages).

(Continued)

*Primary Examiner* — Vladimir Magloire
(74) *Attorney, Agent, or Firm* — Osha • Liang LLP (57) ABSTRACT

A communication apparatus according to the present invention is provided with a mobile station 10, a packet transfer apparatus 50, and an access point 70 which relays between the mobile station 10 and the packet transfer apparatus 50. The cellular side access point 70 transmits a tunnel switch request to the second radio network area, when an authentication processing for establishing a secured connection between the mobile station and the second radio network succeeds, and when the mobile station changes from the first radio network area to the second radio network area.

2 Claims, 8 Drawing Sheets

OTHER PUBLICATIONS

International Search Report for International Application No. PCT/JP2006/321907, mailed on Feb. 13, 2007 (7 pages).

Johnson et al., RFC 3775 Mobility Support in IPv6, Jun. 2004 (143 pages).

C. Perkins, Ed., RFC 3344 IP Mobility Support for IPv4, Aug. 2002 (71 pages).

3GPP TS 23.234 V6.6.0, 3rd Generation Partnership Project; Technical Specification Group Services and System Aspects; 3GPP system to Wireless Local Area Network (WLAN) interworking; System description (Release 6) Sep. 2005 (80 pages).

Patent Abstracts of Japan for Japanese Publication No. 2004-072631, Publication date Mar. 4, 2004 (1 page).

Hyun-Ho Choi et al., "A seamless Handoff Scheme for UMTS-WLAN Interworking", Global Telecommunicaitons Conference, 2004. GLOBECOM '04. IEEE. vol. 3, 2004, pp. 1559-1564 (6 pages).

Taiwanese Office Action for Application No. 095140528, mailed on Mar. 29, 2010 (9 pages).

English Abstract for Taiwanese Publication No. 558883, publication date Oct. 21, 2003 (1 page).

Japanese Office Action for Application No. 2007-542792, mailed on Sep. 14, 2010 (3 pages).

Office Action in Chinese Patent Application No. 200680041053.1 Issued Oct. 13, 2010, with English translation thereof (11 pages).

Japanese Office Action for Application No. 2007-542792, mailed on Jan. 18, 2011 (5 pages).

Patent Abstracts of Japan for Japanese Publication No. 2005-086492, publication date Mar. 31, 2005 (1 page).

ETSI TS 133 234 V6.6.0, Universal Mobile Telecommunications System (UMTS); 3G security; Wireless Local Area Network (WLAN) Interworking Security (3GPP TS 33.234 Version 6.6.0 Release 6) Sep. 2005, (88 pages).

Extended European Search Report for Application No. 06822827.9 dated Jun. 21, 2011 (10 pages).

Office Action for Chinese Patent Application No. 200680041053.1 Issued Jun. 30, 2011, with English translation thereof (12 pages).

Office Action for Chinese Application No. 200680041053.1 issued Nov. 24, 2011, with English translation thereof (12 pages).

* cited by examiner

FIG. 8 ly, a communication apparatus and a communication method, which allow an effective use of a radio resource, enhance a quality of a switching performance by shortening a delay of a switching processing, and achieve an improvement of a node security.

COMMUNICATION APPARATUS AND COMMUNICATION METHOD FOR TUNNEL SWITCHING

TECHNICAL FIELD

The present invention relates to a communication apparatus and a communication method, which relays between a mobile station and a transfer apparatus that manages routing information of the mobile station.

PRIOR ART

In the present situation, a technique for linking a 3GPP cellular network with a WLAN system to collaborate with each other has been defined in the 3GPP (3rd Generation Partnership Project) (For example, see Non-patent Document 1). This specification defines a scheme (WLAN Direct IP access) for enabling the 3GPP cellular network and the WLAN system network to collaborate with each other through an authentication, and a scheme (WLAN 3GPP IP access) for allowing services in the 3GPP cellular to be used from the WLAN system. At this moment, however, no technique has been defined for performing a movement control when the mobile station changes the system between the 3GPP cellular system and the WLAN system during communications.

In terms of an Internet world, a Mobile IP has been defined as a technique of implementing a movement control over different subnets (for example, see Non-patent Document 2 and Non-patent Document 3). This technique can be considered as one of candidate techniques of Implementing a scheme for controlling mobile communications between a 3GPP cellular network and the WLAN system.

Figure 8:
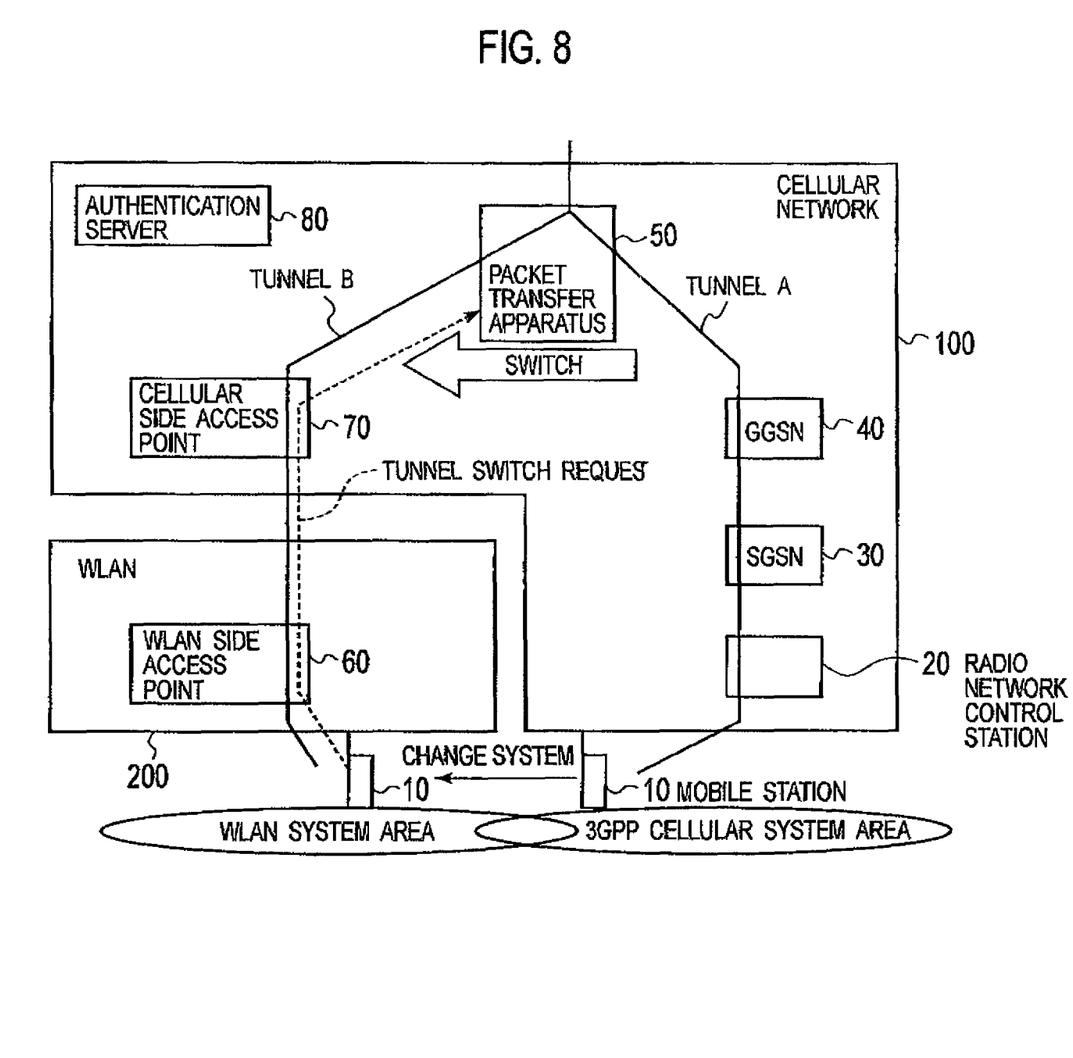
FIG. 8 is a configuration block diagram of a conventional communication system.

Here, suppose that this Mobile IP scheme is applied to the scheme for controlling the mobile communications between the 3GPP cellular network and the WLAN system. As shown in FIG. 8, when a mobile station 10 changes the area from the 3GPP cellular system area to the WLAN system area, the mobile station 10 transmits a request for switching a tunnel to a cellular network 100, to a packet transfer apparatus 50 (for instance, a Mobility Anchor) via a WLAN side access point 60 and a cellular side access point 70 (for instance, a PDG). Thereafter, a switch from a tunnel A to a tunnel B is performed.

When the Mobile IP scheme is directly applied as described above, however, a problem arises that a transmission of a control signaling from the mobile station increases a signaling traffic load in a radio communication zone. Moreover, there is also another problem of a delay of a tunnel switching processing because the mobile station implements the control function, whereby a longer time is required to switch a tunnel to the other radio network. Furthermore, the mobile station needs address information of a network node, such as a packet transfer apparatus or the like, when the mobile station transmits the control signaling. This causes still another problem of degrading a security of the network node.

Non-patent Document 1: 3GPP TS23.234 V6.6.0
Non-patent Document 2: RFC3344 (IP Mobility Support for Ipv4)
Non-patent Document 3: RFC3775 (Mobility Support in Ipv6)

DISCLOSURE OF THE INVENTION

In view of the aforementioned problems, the present invention has an object of providing a communication apparatus In order to accomplish the above-described object, a first aspect of the present invention is summarized as a communication apparatus which is located on a first radio network or a second radio network, and relays between a mobile station which camps on the first radio network area, and a transfer apparatus which manages routing information of the mobile station, including: a tunnel switching function configured to transmit, to the transfer apparatus, a tunnel switch request to the second radio network area, when an authentication processing for establishing a secured connection between the mobile station and the second radio network succeeds, and when the mobile station changes an area from the first radio network area to the second radio network area.

A second aspect of the present invention is summarized as a communication method in a communication system provided with a first radio network, a second radio network, a mobile station which camps on the first radio network area, a transfer apparatus which manages routing information of the mobile station, and a communication apparatus which is located on the first radio network or the second radio network and which relays between the mobile station and the transfer apparatus, including: transmitting, to the transfer apparatus, a tunnel switch request to the second radio network area, when an authentication processing for establishing a secured connection between the mobile station and the second radio network succeeds, and when the mobile station changes an area from the first radio network area to the second radio network area.

BEST MODES FOR CARRYING OUT THE INVENTION

Hereinafter, embodiments of the present invention will be described by referring to the drawings. In the following description of the drawings, the same or similar reference numerals are given to the same or similar components. In addition, it should be noted that the drawings are schematic ones.

In the embodiments of the present invention, description will be provided for an operation in which, a communication apparatus located between a mobile station and a packet transfer apparatus transmits, to the packet transfer apparatus, a tunnel switch request to a second radio network, when a predetermined condition is satisfied and when the mobile station changes the area from the first radio network area to the second radio network area.

First Embodiment (Communication System)

Figure 1:
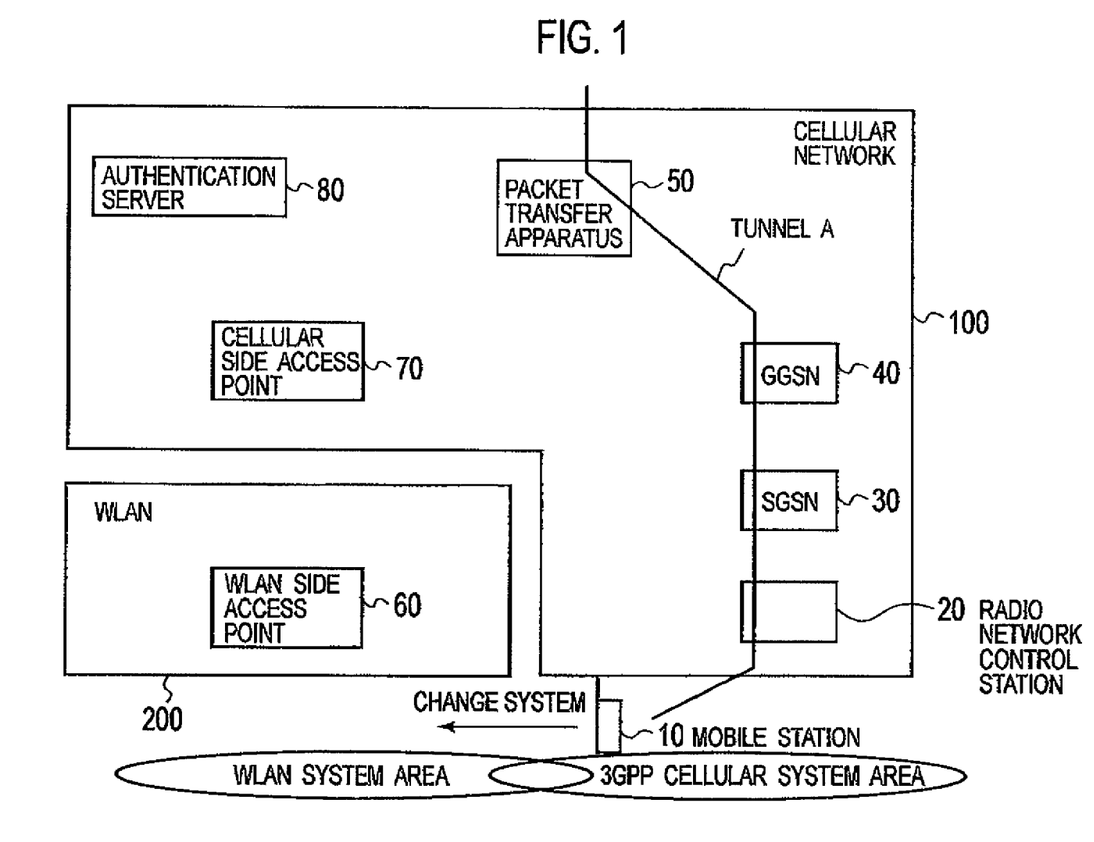
FIG. 1 is a configuration block diagram of a communication system according to a first embodiment of the present invention (no. 1).

In the first embodiment, description will be provided for an example that a mobile station 10 changes a system to a WLAN system while the mobile station 10 performs a communication in a 3GPP cellular system as shown in FIG. 1. At this time, a cellular side access point 70 transmits a tunnel switch request to a packet transfer apparatus 50 as shown in FIG. 2, and thereby a tunnel for a call of the mobile station 10 is switched from a tunnel A to a tunnel B.

Figure 2:
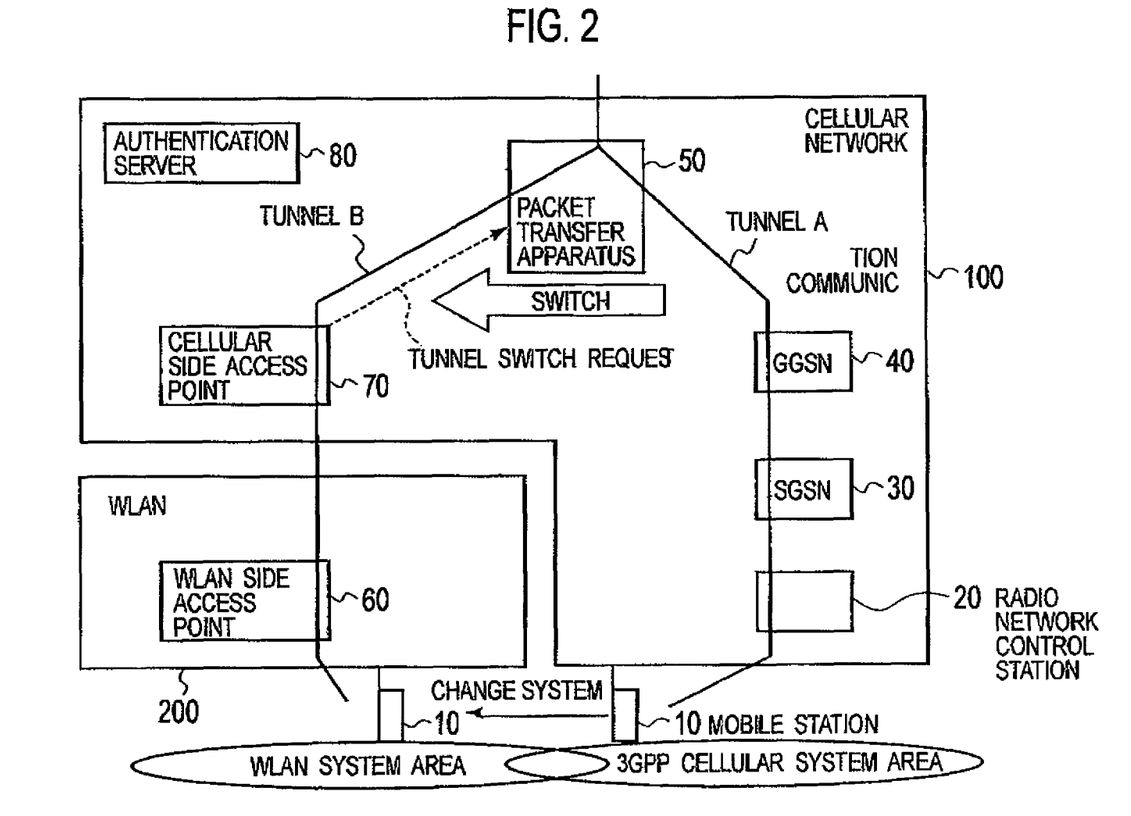
FIG. 2 is a configuration block diagram of the communication system according to the first embodiment of the present invention (no. 2)

A WLAN system 200 shown in FIGS. 1 and 2 is connected to a cellular network 100 in a connection structure capable of providing a WLAN 3GPP IP access. In the cellular network 100, a radio network control station (RNC) 20, an SGSN (Serving GPRS support node) 30, a GGSN (Gateway GPRS Support Node) 40, the packet transfer apparatus 50, the cellular side access point 70 and an authentication server 80 are arranged. In the WLAN 200, a WLAN side access point 60 is arranged. In addition to these, needless to say, necessary network apparatuses are arranged as needed though they are not illustrated. For example, a gateway is arranged between the cellular network 100 and the WLAN 200 and a radio base station is arranged between the mobile station 10 and the radio network control station 20.

Each of the component apparatuses will de described below.

The radio network control station 20 controls a plurality of radio base stations.

The SGSN 30 manages subscriber information (a QoS service class which can be provided, information on connectable destinations, authentication method, etc.) of every mobile subscriber which camps on an area of the SGSN 30. In addition, when the mobile station 10 makes or receives a call, the SGSN 30 determines whether or not to accept a connection, and controls the connection to a connection destination based on the subscriber information.

The GGSN 40 performs an access control (a connection notification, a call arrival notification and the like) for an access to an ISP (Internet Service Provider). In addition, the GGSN 40 manages a data communication address that is required to be allocated to the mobile station 10 for a packet communication.

The packet transfer apparatus 50 registers routing information of the mobile station 10, and manages the routing information. A home agent in the Mobile IP scheme, for example, can be referred to as the packet transfer apparatus 50.

The cellular side access point 70 is a communication apparatus which relays between the mobile station 10 and the packet transfer apparatus 50. A PDG, for example, can be referred to as the cellular side access point 70.

Figure 3:
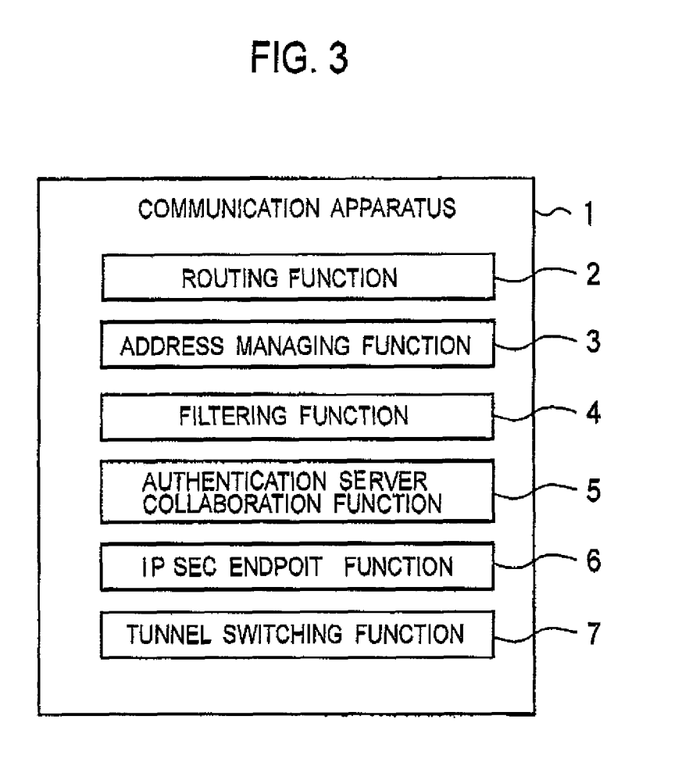
FIG. 3 is a configuration block diagram of a communication apparatus according to the first embodiment of the present invention.

As shown in FIG. 3, the cellular side access point 70 (communication apparatus) includes a routing function 2, an address managing function 3, a filtering function 4, an authentication server collaboration function 5, an IPsec endpoint function 6 and a tunnel switching function 7.

The routing function 2 determines the tunnel to transfer packets transmitted between a sender and a receiver.

The address managing function 3 manages an address of the connection destination.

The filtering function 4 permits only a certain packet to pass therethrough, and prohibits a packet other than the certain packet from passing therethrough.

The authentication server collaboration function 5 collaborates with the authentication server 80, and performs an authentication processing to establish a secured connection between the mobile station 10 and the WLAN 200.

Specifically, the authentication server collaboration function 5 transmits an authentication request to the authentication server 80 so as to perform a user authentication processing that is required to set up an IPsec tunnel between the IPsec endpoint function 6 and the mobile station 10. Then, when the authentication processing has been successful, the authentication server collaboration function 5 receives, from the authentication server 80, an authentication response that indicates the success.

The IPsec endpoint function 6 sets up the IPsec tunnel between the cellular side access point 70 and the mobile station 10.

Specifically, the IPsec endpoint function 6 sets up the IPsec tunnel between the cellular side access point 70 and the mobile station 10 in response to an IPsec setting request that includes the tunnel switch request and is transmitted from the mobile station 10 via the WLAN side access point 60.

When the mobile station 10 changes the system from the 3GPP cellular system area to the WLAN system area, the tunnel switching function 7 transmits, to the packet transfer apparatus 50, the tunnel switch request to the WLAN 200, when the predetermined condition is satisfied. (see FIG. 2)

Specifically, the tunnel switching function 7 transmits, to the packet transfer apparatus 50, the tunnel switch request to the WLAN 200, when the authentication server collaboration function 5 receives the aforementioned authentication response.

In other words, contrary to the conventional technique (Mobile IP), in which the mobile station 10 transmits the tunnel switch request to the WLAN 200 after the mobile station 10 transmits the IPsec setting request, this embodiment is configured such that the tunnel switching function 7 of the cellular side access point 70 transmits a request for switching the tunnel, to the WLAN 200, when the user authentication processing succeeds. Accordingly, this embodiment is configured such that an effective use of the radio resource is achieved.

Here, the predetermined condition is referred to be as that the tunnel switching function 7 detects that the mobile station 10 changes the system from the 3GPP cellular system area to the WLAN system area (for example, detects by receiving a notification from the mobile station), and that the authentication processing for establishing a secured connection between the mobile station 10 and the WLAN 200 succeeds.

The authentication server 80 performs the user authentication processing required for setting up the IPsec tunnel. An AAA, for example, can be referred to as the authentication server 80. The AAA has a function for performing an authentication, an authorization and an accounting, respectively.

The WLAN side access point 60 is a communication apparatus that relays between the mobile station 10 and the cellular side access point 70. A radio access point (AP) is one example of the WLAN side access point 60.

(Communication Method)

Figure 4:
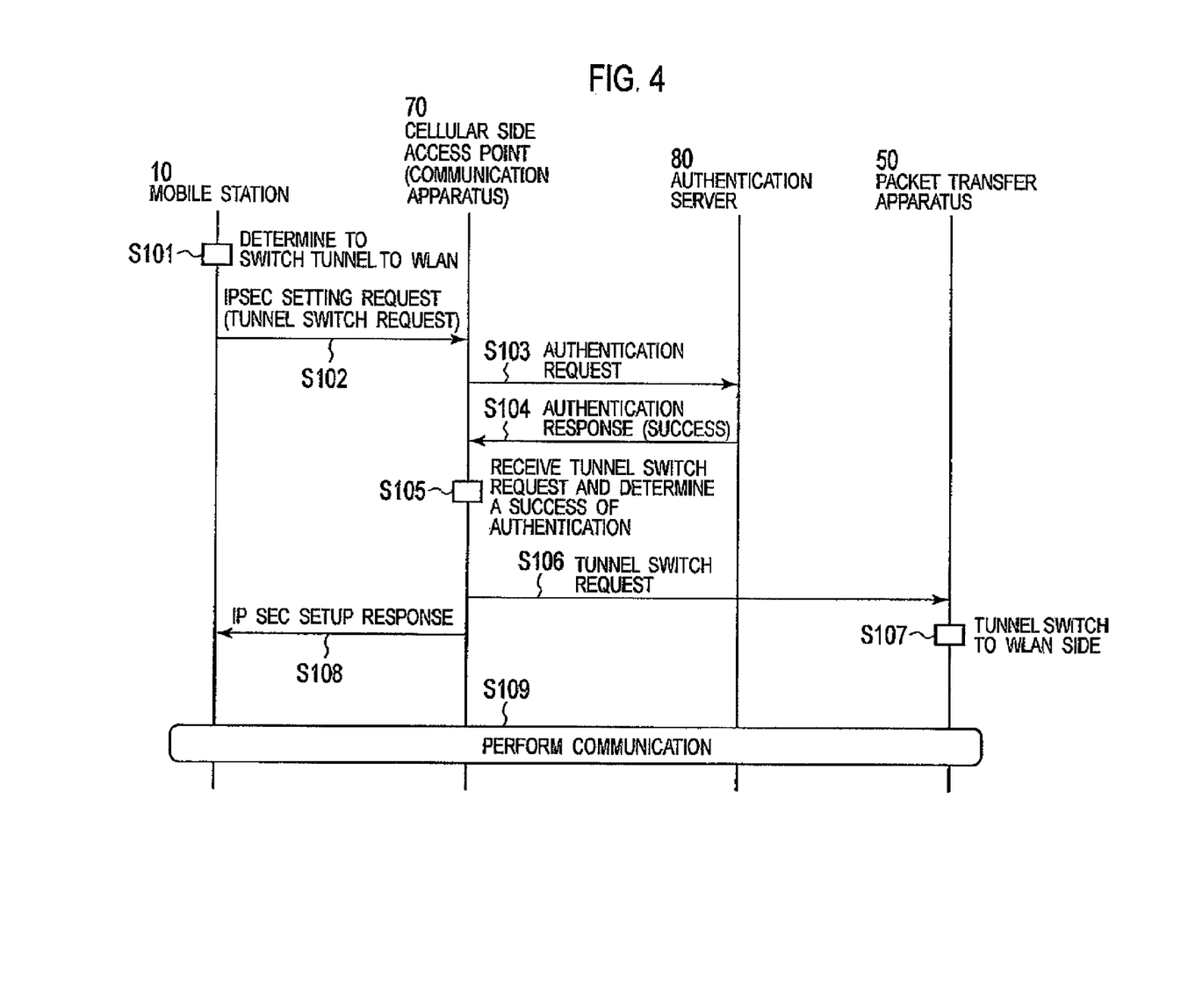
FIG. 4 is a sequence diagram Illustrating a communication method according to the first embodiment of the present invention.

Hereinbelow, a communication method according to the first embodiment will be described by use of FIG. 4.

When the mobile station 10 changes the area from the cellular system area to the WLAN area while the mobile station 10 performs a communication, the mobile station 10 firstly detects a presence of the radio area of the WLAN 200, and determines whether or not to switch the tunnel for the call during the communication from the cellular network 100 to the WLAN 200 (S101).

After that, when it is determined that the tunnel switching is required, the mobile station 10 starts a processing operation of a WLAN 3GPP IP access for the WLAN, and sets up the IPsec tunnel between the mobile station 10 and the cellular side access point 70 (for example, a PDG). In order to set up this IPsec tunnel, the mobile station 10 transmits the IPsec setting request including the tunnel switch request (S102) so that the cellular side access point 70 can distinguish the request from a usual WLAN communication request (for example, distinguish the call from a call which does not require the tunnel switching).

When the cellular side access point 70 receives this IPsec tunnel setting request including the tunnel switch request, the cellular side access point 70 detects that the mobile station 10 changes the system from the 3GPP cellular system area to the WLAN system area, and transmits the authentication request to the authentication server 80 (for example, an AAA) (S103) for the user authentication processing required for setting up the IPsec tunnel. Thereafter, when a signaling that indicates the authentication processing succeeds is received from the authentication server 80, the processing moves to step S105 and the following steps. Note that, here, when the authentication fails, the tunnel for the call during the communication cannot be switched from the cellular network 100 to the WLAN 200. Thus, the processing is terminated.

Next, the cellular side access point 70 determines whether or not the cellular side access point 70 receives the tunnel switch request from the mobile station 10, and whether or not the authentication processing for establishing the secured connection between the mobile station 10 and the WLAN 200 succeeds (S105). When the tunnel switch request is received and the authentication processing succeeds, the cellular side access point 70 transmits the tunnel switch request to the packet transfer apparatus 50 (For example, a Mobility Anchor) (S106).

Then, in response to the request, the packet transfer apparatus 50 switches the tunnel for the call I of the mobile station 10 from the cellular network 100 to the WLAN 200 (S107). Meanwhile, the cellular side access point 70 transmits a response notification to the mobile station 10, the response notification that indicates a completion of a setup of the IPsec tunnel (S108). Eventually, the mobile station 10 performs a communication via the WLAN 200 (S109).

(Operations and Effects)

According to the cellular side access point 70 (the communication apparatus) and the communication method of the first embodiment, the effective use of the radio resource can be utilized, since the mobile station 10 does not directly transmit the tunnel switch request to the packet transfer apparatus 50.

Moreover, the quality of the switching performance can be enhanced by shortening the delay of the switching, since the cellular side access point 70 performs the switching processing. Furthermore, address information of the network nodes can be hidden, since the network side leads the performance of the switching processing. Thus, the improvement of the node security can be expected.

Second Embodiment (Communication System)

In the first embodiment, the description has been provided for the example that the mobile station 10 changes the system to the WLAN system while the mobile station 10 performs a communication in the 3GPP cellular system. In the second embodiment, description will be provided for an example where a mobile station 10 changes the system to a 3GPP cellular system while the mobile station 10 performs a communication in a WLAN system as shown in FIG. 5.

Figure 6:
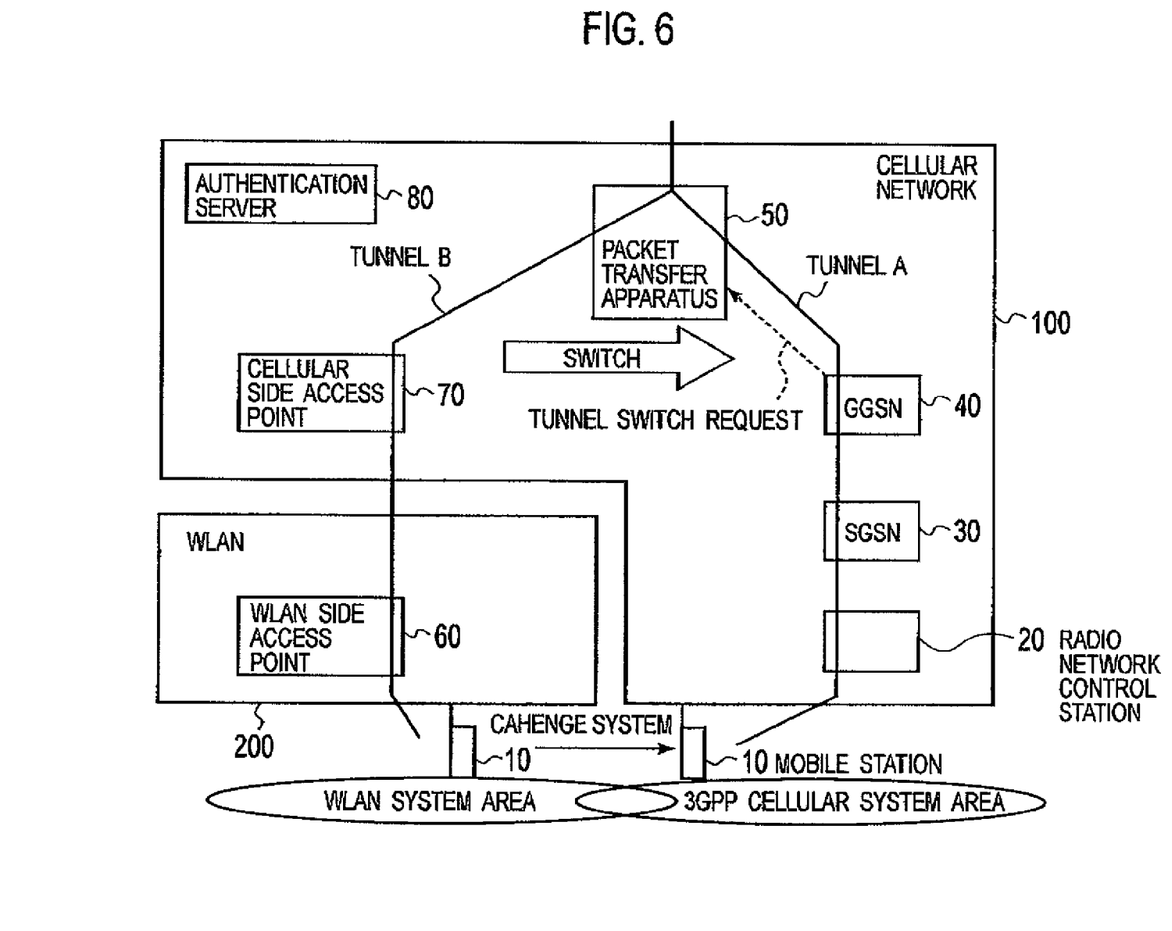
FIG. 6 is a configuration block diagram of the communication system according to the second embodiment of the present invention (no. 2)

In the second embodiment, as shown in FIG. 6, a GGSN 40 transmits a tunnel switch request to a packet transfer apparatus 50, and thereby a tunnel for the call for the mobile station 10 is switched from a tunnel A to a tunnel B.

Figure 5:
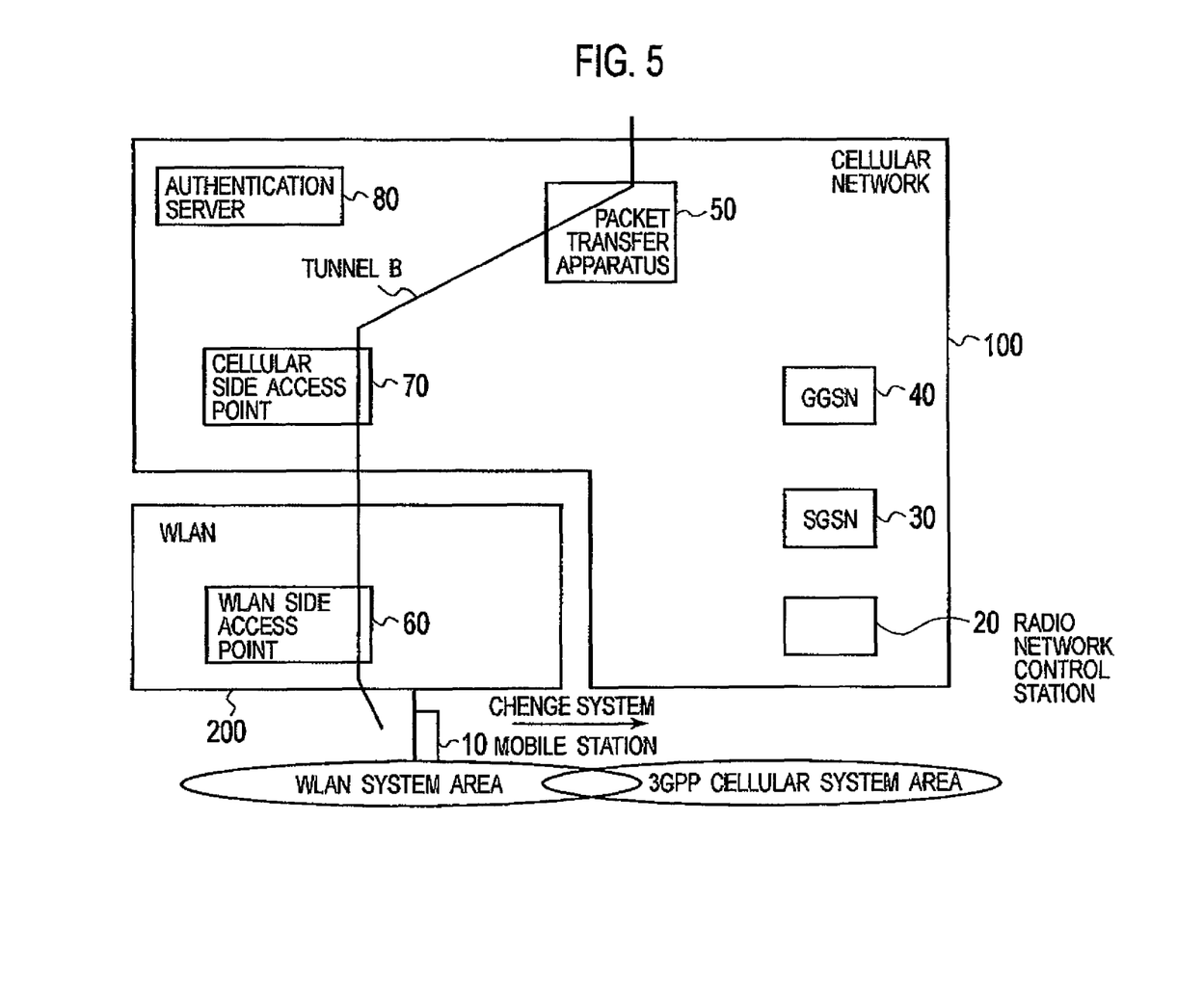
FIG. 5 is a configuration block diagram of a communication system according to a second embodiment of the present invention (no. 1).

A WLAN system 200 shown in FIGS. 5 and 6 is connected to a cellular network 100 in a connection structure capable of providing WLAN 3GPP IP access. In the cellular network 100, a radio network control station (RNC) 20, an SGSN (Serving GPRS support node) 30, a GGSN (Gateway GPRS Support Node) 40, the packet transfer apparatus 50, a cellular side access point 70 and an authentication server 80 are arranged. In the WLAN 200, a WLAN side access point 60 is arranged. In addition to these, needless to say, necessary network apparatuses are arranged as needed though they are not illustrated. For example, a gateway is arranged between the cellular network 100 and the WLAN 200 and a radio base station is arranged between the mobile station 10 and the radio network control station 20.

The GGSN 40 performs access control (a connection notification, a call arrival notification and the like) for an access to an ISP (Internet Service Provider). In addition, the GGSN 40 manages data communication addresses that are need to be allocated to the mobile station 10 for a packet communication.

The GGSN 40 (communication apparatus) according to the second embodiment includes a tunnel switching function as similar to the cellular side access point 70 described in the first embodiment.

When the mobile station 10 changes the system from the WLAN system area to the 3GPP cellular system area, the tunnel switching function transmits a tunnel switch request to the packet transfer apparatus 50 (see FIG. 6) when a predetermined condition is satisfied. Here, the predetermined condition is such as that the tunnel switching function detects that the mobile station 10 changes the area from the WLAN system area to the 3GPP cellular system area, and that the authentication processing for establishing a secured connection between the mobile station 10 and the cellular network 100 succeeds.

The radio network control station 20, the SGSN 30, the packet transfer apparatus 50, the WLAN side access point 60, the cellular side access point 70 and the authentication server 80 are the same as those in the first embodiment, and accordingly the description thereof is omitted here.

(Communication Method)

Figure 7:
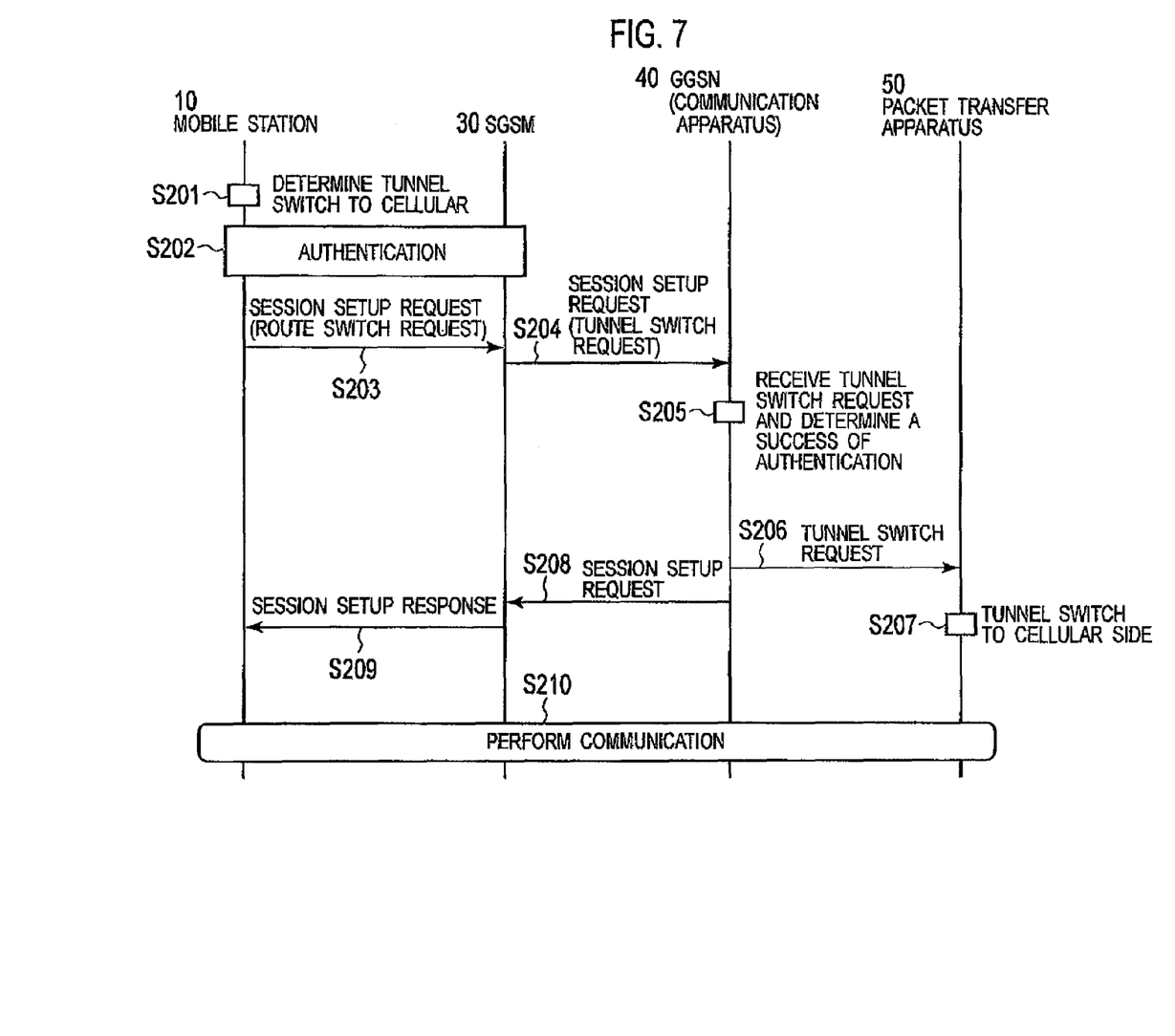
FIG. 7 is a sequence diagram illustrating a communication method according to the second embodiment of the present invention.

Next, a communication method according to the second embodiment will be described by use of FIG. 7.

When the mobile station 10 changes the area from the WLAN area to the cellular network while the mobile station 10 performs a communication, the mobile station 10 firstly detects the presence of the cellular network 100, and determines whether or not to switch the tunnel for the call during the communications from the WLAN 200 to the cellular network 100 (S201).

After that, the mobile station 10 performs the authentication processing in collaboration with the SGSN 30 (S202).

Here, when the authentication succeeds, the processing moves to step 203 and the following steps. Note that, when the authentication fails, the tunnel for the call during communications cannot be switched from the WLAN 200 to the cellular network 100. Thus, the processing is terminated.

Next, when the mobile station 10 determines that the tunnel switching is required, the mobile station 10 transmits a session setup request to the cellular network 100 (S203). In setting up the session, the mobile station 10 transmits the session setup request including the tunnel switch request so that the GGSN 40 can distinguish the request from a usual session setup request (for example, distinguishes the call from a call not needing the tunnel switching).

Then, the SGSN 30 transmits the session setup request including the tunnel switch request to the GGSN 40 (S204).

Next, the GGSN 40 receives the tunnel switch request from the mobile station 10 via the SGSN 30 (S205). When the authentication processing succeeds, the GGSN 40 transmits the tunnel switch request to the packet transfer apparatus 50 (For example, a Mobility Anchor) (S206).

Then, in response to the request, the packet transfer apparatus 50 switches the tunnel for the call of the mobile station 10 from the WLAN 200 to the cellular network 100 (S207). Meanwhile, the GGSN 40 transmits, to the SGSN 30, a response notification that indicates a completion of the session setup (S208), and the SGSN 30 transmits, to the mobile station 10, a response notification that indicates the completion of the session setup (S209). Eventually, the mobile station 10 performs a communication via the cellular network 100 (S210).

(Operations and Effects)

According to the CGSN40 (the communication apparatus) and the communication method of the second embodiment, the effective use of the radio resource can be utilized, since the mobile station 10 does not directly transmit the tunnel switch request to the packet transfer apparatus 50. Moreover, the quality of the switching performance can be enhanced by shortening the delay of the switching, since the CGSN40 (the communication apparatus) performs the switching processing. Furthermore, address information of the network nodes can be hidden, since the network side leads the performance of the switching processing. Thus, the improvement of the node security can be expected.

Other Embodiments

Although the present invention has been described by use of the foregoing embodiments, it should not be understood that the description and drawings constituting a part of this disclosure limit the present invention. From this disclosure, various alternative embodiments, examples and applied techniques are obvious to those skilled in the art.

For example, although the mobile station 10 determines whether or not to switch the tunnel (step S101 in FIG. 4 and step S201 in FIG. 7) in the first and second embodiments, the communication apparatus (for example, the PDG 70 or the GGSN 40) may determine whether or not to switch the tunnel. In addition, although the communication apparatus detects that the mobile station changes the network to a different radio network, by receiving the tunnel switch request from the mobile station 10, the detection method is not limited to this. The communication apparatus may detect that the mobile station changes the network to a different radio network, by monitoring the mobile station 10.

Further, although the PDG 70 and the GGSN 40 have been described as the communication apparatuses of the present invention in the first and second embodiment, the communication apparatus according to the present invention can be any apparatus as long as the apparatus are located on the radio network. Thus, any of the radio network control station 20, the SGSN 30, the WLAN side access point 60 and the like can also have the tunnel switching function (the tunnel switching function 7 shown in FIG. 3).

As described above, the present invention obviously includes various embodiments that are not described here. Accordingly, the technical scope of the present invention is only defined by the specific matters of the invention according to the scope of claims which are appropriate based on the above description.

INDUSTRIAL APPLICABILITY

The present invention makes it possible to provide a communication apparatus and a communication method, which allow an effective use of a radio resource, enhance a quality of a switching performance by shortening a delay of a switching processing, and achieve an improvement of a node security.

The invention claimed is:

1. A communication apparatus provided in a $3^{rd}$ Generation Partnership Project (3GPP) cellular network and Non-3GPP Access Network, wherein
   the 3GPP cellular network comprises a transfer apparatus, an authentication server, a radio base station, and cellular-side access point,
   the Non-3GPP access network comprises at least a Non-3GPP access point, a communication path via the 3 GPP cellular network including the radio base station and the transfer apparatus,
   a communication path via the Non-3GPP access network including the Non-3GPP access point, the cellular side access point and the transfer apparatus,
   the communication apparatus is provided between a mobile station and the transfer apparatus in the communication path via a first radio network which is any one of the 3GPP cellular network and the Non-3GPP access network, and relays that the mobile station is camped on the first radio network, and
   the transfer apparatus manages routing information of the mobile station,
   the communication apparatus comprising:
   an authentication server collaboration function configured to transmit an authentication request to the authentication server to perform an authentication process for establishing a secured connection between the mobile station and a second radio network which is another one of the 3GPP cellular network and the Non-3GPP Access Network, and when the authentication process succeeds, the authentication server collaboration function receives an authentication response indicating the success from the authentication server; and
   a tunnel switching function configured to transmit, to the transfer apparatus, a tunnel switch request to the second radio network, when an user authentication process succeeds caused by the authentication process for establishing the secured connection between the mobile station and the second radio network succeeding, and when the mobile station changes an area from an area of the first radio network to an area of the second radio network.

2. A communication method used in a communication system including a $3^{rd}$ Generation Partnership Project (3GPP) cellular network and a Non-3GPP Access Network, wherein
   the 3GPP cellular network comprises a transfer apparatus, an authentication server, a radio base station, and cellular-side access point, the Non-3GPP access network comprises at least a Non-3GPP access point, a communication path via the 3GPP cellular network including the radio base station and the transfer apparatus, a communication path via the Non-3GPP access network including the Non-3GPP access point, the cellular side access point and the transfer apparatus, a communication apparatus is provided between a mobile station and the transfer apparatus in the communication path via a first radio network which is any one of the 3GPP cellular network and the Non-3GPP access network, and relays that the mobile station is camped on the first radio network, and the transfer apparatus manages routing information of the mobile station, the communication method comprising:

transmitting, from the communication apparatus to the authentication server, an authentication request to perform an authentication process for establishing a secured connection between the mobile station and a second radio network which is another one of the 3GPP cellular network and the Non-3GPP Access Network, transmitting, from the authentication server to the communication apparatus, an authentication response indicating the success from the authentication server, when the authentication process succeeds, and transmitting, from the communication apparatus to the transfer apparatus, a tunnel switch request to the second radio network, when an user authentication process succeeds caused by the authentication process for establishing the secured connection between the mobile station and the second radio network succeeding, and when the mobile station changes an area from an area of the first radio network to an area of the second radio network.

* * * * *